United States Patent
Marchon et al.

(10) Patent No.: US 9,365,454 B2
(45) Date of Patent: Jun. 14, 2016

(54) COMB POLYMERS AS DISPERSANTS FOR ALKALINE ACTIVATED BINDERS

(75) Inventors: Delphine Marchon, Bulle (CH); Ueli Sulser, Unterengstringen (CH); Arnd Eberhardt, Winterthur (CH); Robert Flatt, Feldmeilen (CH)

(73) Assignee: SIKA TECHNOLOGY AG, Baar (CH)

(*) Notice: Subject to any disclaimer, the term of this patent is extended or adjusted under 35 U.S.C. 154(b) by 135 days.

(21) Appl. No.: 14/115,370

(22) PCT Filed: Jun. 15, 2012

(86) PCT No.: PCT/EP2012/061411
§ 371 (c)(1),
(2), (4) Date: Nov. 4, 2013

(87) PCT Pub. No.: WO2012/172040
PCT Pub. Date: Dec. 20, 2012

(65) Prior Publication Data
US 2014/0080943 A1    Mar. 20, 2014

(30) Foreign Application Priority Data
Jun. 17, 2011   (EP) .................................... 11170375

(51) Int. Cl.
*C04B 24/26*   (2006.01)
*C08F 222/06*   (2006.01)
(Continued)

(52) U.S. Cl.
CPC ........... *C04B 24/2694* (2013.01); *C04B 28/021* (2013.01); *C04B 28/08* (2013.01); *C08F 222/06* (2013.01); *C08F 216/1416* (2013.01)

(58) Field of Classification Search
CPC .. C04B 24/2694; C04B 28/021; C08F 222/06
USPC ........................................................ 524/55
See application file for complete search history.

(56) References Cited

U.S. PATENT DOCUMENTS

2008/0300343 A1* 12/2008 Becker ................ C04B 24/2647
                                                    524/5
2009/0163622 A1* 6/2009 Albrecht et al. ................... 524/5
2012/0010331 A1   1/2012 Yonezawa et al.

FOREIGN PATENT DOCUMENTS

DE   10 2005 061 153 A1   6/2007
EP        1 138 697 B1   11/2003
(Continued)

OTHER PUBLICATIONS

Flatt et al., "The Role of Adsorption Energy in the Sulfate-Polycarboxylate Competition," Proc. $9^{th}$ ACI Int. Conf. Superplasticizers and Other Chemical Admixtures in Concrete, American Concrete Institute, Detroit, 2009, pp. 153-164.

(Continued)

*Primary Examiner* — Ling Choi
*Assistant Examiner* — Lanee Reuther
(74) *Attorney, Agent, or Firm* — Oliff PLC (57) ABSTRACT

A comb polymer that is a dispersant in a binder composition includes an alkaline activating agent, wherein the activating agent is intended for activation of a latently hydraulic and/or puzzolanic binder, and wherein the comb polymer has a polymer backbone formed from a plurality of backbone monomers and a plurality of polymeric side chains each formed from a plurality of side chain monomers and bonded thereto, and wherein at least some of the backbone monomers have one or more ionizable groups, and features a structure constant K of the comb polymer, defined as $K=[(N-1)z]^2/nP^{915}N^{3/5}\times10^5$, at least equal to 70, where n is the average number of side chains per comb polymer molecule, N is the average number of backbone monomers per side chain, P is the average number of side chain monomers per side chain, and z is the average number of ionizable groups per side chain-free backbone monomer.

21 Claims, 4 Drawing Sheets

Table:

| Polymer | Backbone | Side chain | | Comb polymer parameter | | | | | | |
|---|---|---|---|---|---|---|---|---|---|---|
| | | Typ | M [g/mol] | $M_n$ [g/mol] | C/E | n | P | N | z | K |
| P1 | Maleic acid/vinyl acetate/allyl ether copolymer | MPEG | 1'100 | 6'600 | 2.8 | 5.1 | 25.0 | 2.8 | 1.5 | 241 |
| P2 | Polymethacrylic acid | MPEG | 1'000 | 12'300 | 3.5 | 8.9 | 22.7 | 4.5 | 1.0 | 203 |
| P3 | Maleic acid/allyl ether copolymer | MPEG | 1'100 | 8'600 | 4.0 | 6.5 | 25.0 | 3.0 | 2.0 | 390 |
| P4 | Maleic acid/vinyl acetate/allyl ether copolymer | MPEG | 1'100 | 13'500 | 3.0 | 9.3 | 25.0 | 3.0 | 1.5 | 152 |
| P5 | Methacrylic acid/methyacrylic acid ester copolymer | MPEG | 1'000 | 17'600 | 3.3 | 12.8 | 22.7 | 4.3 | 1.0 | 128 |
| P6 | Polymethacrylic acid | MPEG | 1'000 | 10'800 | 7.3 | 6.3 | 22.7 | 8.3 | 1.0 | 866 |
| P7 | Polymethacrylic acid | MPEG | 1'000 | 13'500 | 1.7 | 11.0 | 22.7 | 2.7 | 1.0 | 53 |
| P8 | Acrylic acid/methacrylic acid copolymer (1:1) | MPEG | 3'000 | 24'500 | 4.8 | 7.1 | 68.2 | 5.6 | 1.0 | 52 |
| P9 | Polymethacrylic acid | MPEG | 1'000 | 12'600 | 1.8 | 10.2 | 22.7 | 2.8 | 1.0 | 61 |

(51) Int. Cl.
*C04B 28/02* (2006.01)
*C04B 28/08* (2006.01)
*C08F 216/14* (2006.01)

(56) References Cited

FOREIGN PATENT DOCUMENTS

| | | |
|---|---|---|
| JP | 2010-285292 A | 12/2010 |
| JP | 2010-285293 A | 12/2010 |
| WO | WO 2010/029117 A2 | 3/2010 |
| WO | WO 2010029117 A2 * | 3/2010 |

OTHER PUBLICATIONS

International Search Report issued in International Patent Application No. PCT/EP2012/061411 dated Aug. 7, 2012.
International Preliminary Report on Patentability issued in International Patent Application No. PCT/EP2012/061411 dated Dec. 17, 2013.
Dec. 8, 2015 Notice of Reasons for Rejection issued in Japanese Application No. 2014-515202.

* cited by examiner

Table:

| Polymer | Backbone | Side chain | | Comb polymer parameter | | | | | | |
|---|---|---|---|---|---|---|---|---|---|---|
| | | Typ | M [g/mol] | $M_n$ [g/mol] | C/E | n | P | N | z | K |
| P1 | Maleic acid/vinyl acetate/allyl ether copolymer | MPEG | 1'100 | 6'600 | 2.8 | 5.1 | 25.0 | 2.8 | 1.5 | 241 |
| P2 | Polymethacrylic acid | MPEG | 1'000 | 12'300 | 3.5 | 8.9 | 22.7 | 4.5 | 1.0 | 203 |
| P3 | Maleic acid/allyl ether copolymer | MPEG | 1'100 | 8'600 | 4.0 | 6.5 | 25.0 | 3.0 | 2.0 | 390 |
| P4 | Maleic acid/vinyl acetate/allyl ether copolymer | MPEG | 1'100 | 13'500 | 3.0 | 9.3 | 25.0 | 3.0 | 1.5 | 152 |
| P5 | Methacrylic acid/methyacrylic acid ester copolymer | MPEG | 1'000 | 17'600 | 3.3 | 12.8 | 22.7 | 4.3 | 1.0 | 128 |
| P6 | Polymethacrylic acid | MPEG | 1'000 | 10'800 | 7.3 | 6.3 | 22.7 | 8.3 | 1.0 | 866 |
| P7 | Polymethacrylic acid | MPEG | 1'000 | 13'500 | 1.7 | 11.0 | 22.7 | 2.7 | 1.0 | 53 |
| P8 | Acrylic acid/methacrylic acid copolymer (1:1) | MPEG | 3'000 | 24'500 | 4.6 | 7.1 | 68.2 | 5.6 | 1.0 | 52 |
| P9 | Polymethacrylic acid | MPEG | 1'000 | 12'600 | 1.8 | 10.2 | 22.7 | 2.8 | 1.0 | 61 |

COMB POLYMERS AS DISPERSANTS FOR ALKALINE ACTIVATED BINDERS

TECHNICAL FIELD

The invention relates to the use of a comb polymer as a dispersant in a binder composition containing an alkaline activating agent. In addition, the invention relates to a binder composition and a method for production of same. Another aspect of the present invention relates to a molded body obtainable from a binder composition.

PRIOR ART

Production of cement generates a substantial amount of $CO_2$, which is relevant for the climate. To reduce $CO_2$ emissions, some of the cement in binder compositions can be replaced by latent hydraulic and/or puzzolanic cement additives, e.g., fly ash, slag or silica dust. Such additives are formed as by-products in various industrial processes and are therefore advantageous with respect to the $CO_2$ balance. However, setting of such cement additives takes much longer in lieu of additional measures than is the case with hydraulic cement. This is a disadvantage in particular with regard to high early strength values of binder compositions. However, it is also possible to activate latent hydraulic and puzzolanic additives by alkaline and/or basic activating agents, for example.

To improve the processability of cement binder compositions with the lowest possible water/binder ratio, it is also customary to use so-called dispersants as liquefiers. Good processability of the liquid binder composition and a high mechanical strength after setting are therefore both achieved. Comb polymers based on polycarboxylate, for example, are known as especially effective dispersants. Such comb polymers have a polymer backbone to which side chains are bound. Corresponding polymers are described in EP 1 138 697 A1 (Sika AG), for example.

It has been found that comb polymers based on polycarboxylate are extremely sensitive to highly basic conditions in general. If such dispersants are used in binder compositions together with alkaline activating agents, they lose their effect after a short period of time.

Therefore, there is still a demand for effective dispersants, which can also be used in alkaline activated binder compositions.

SUMMARY OF THE INVENTION

The object of the invention is therefore to provide dispersants with which the disadvantages mentioned above are overcome. These dispersants should be usable in alkaline activated binder compositions in particular and should remain effective for as long as possible.

It has surprisingly been found that the object according to the invention can be achieved by using a comb polymer KP according to Claim 1. The comb polymer KP is characterized in particular in that a structural constant K, which is defined as $$K = \frac{[(N-1)z]^2}{nP^{9/5}N^{3/5}} \times 10^5,$$

is at least equal to 70, wherein
n indicates an average number of side chains per comb polymer molecule,
N stands for the average number of backbone monomers per side chain,
P indicates the average number of side chain monomers per side chain, and
z represents the average number of ionizable groups per side chain-free backbone monomer.

The structure constant K is referred as the adsorption equilibrium constant and indicates the theoretical adsorption capability of a molecule on a cement surface. The larger K is, the better is the absorption capacity.

Additional details regarding the structure constant K can be found in: R. J. Platt, J. Zimmerman, C. Hampel, C. Kurz, I. Schober, C. Plassard and E. Lesniewska, *"The role of adsorption energy in the sulphate-polycarboxylate competition,"* Proc. $9^{th}$ ACI Int. Conf. Superplasticizers and Other Chemical Admixtures in Concrete, (editors: T. C. Holland, P. R. Gupta, V. M. Malhotra), American Concrete Institute, Detroit, SP-262-12 (2009) pp. 153-164.

As has already been demonstrated, the comb polymers KP used according to the invention are surprisingly insensitive to alkaline conditions such as those prevailing, for example, in alkaline activated binder compositions with latent hydraulic and/or puzzolanic binders in comparison with other comb polymers having a lower K value.

This is apparent in particular in that the difference in the flowability of prepared binder compositions that contain comb polymers, with and without alkaline activating agents for latent hydraulic and/or puzzolanic binders, turns out to be relatively minor.

The copolymers KP according to the invention thus remain active for a longer period of time as dispersants or liquefiers, even in alkaline activated binder compositions, and they permit good processability at a low water/cement ratio.

The comb polymers KP can thus be used advantageously, in particular for liquefaction, for reducing the water demand and/or for improving the processability of mineral binder compositions that contain alkaline activating agents.

Additional aspects of the invention are the subject matter of additional independent claims. Particularly preferred embodiments of the invention are the subject matter of the dependent claims.

METHODS FOR IMPLEMENTING THE INVENTION

A first aspect of the present invention relates to the use of a comb polymer KP as a dispersant in a binder composition containing an alkaline activating agent, wherein the activating agent is provided or is suitable in particular for activating a latent hydraulic and/or puzzolanic binder and wherein the copolymer KP has a polymer backbone composed of multiple backbone monomers and multiple polymer side chains bound thereto, each comprised of multiple side chain monomers, and wherein at least a portion of the backbone monomers have one or more ionizable groups, characterized in that a structure constant K of the comb polymer KP, which is defined as $$K = \frac{[(N-1)z]^2}{nP^{9/5}N^{3/5}} \times 10^5,$$

is at least equal to 70, wherein
n indicates an average number of side chains per comb polymer molecule, N stands for the average number of backbone monomers per side chain, P indicates the average number of side chain monomers per side chain, and z represents the average number of ionizable groups per side chain-free backbone monomer.

The structure constant K is preferably at least equal to 100, more preferably at least equal to 200, even more preferably at least equal to 250.

With the average number of backbone monomers per side chain (N), the backbone monomer carrying the side chain is also counted as a backbone monomer.

The term "ionizable groups" is understood in particular to refer to functional groups, which are present in anionic form or have a negative charge at a pH>10, in particular at a pH>12. These include H donor groups or acid groups in particular. The ionizable groups are especially preferably acid groups, carboxylic acid groups, sulfonic acid groups, phosphoric acid groups and/or phosphonic acid groups. Carboxylic acid groups are preferred. The acid groups may also be present as anions in deprotonized form or as a salt with a counter ion or cation.

The average number of ionizable groups per side chain-free backbone monomer is understood in particular to refer to the sum of all ionizable groups of the backbone monomers divided by the sum of backbone monomers that have no side chain. Side chain-free backbone monomers are thus the backbone monomers that do not have any side chains.

The term "comb polymer" in the present context refers in general to polymers consisting of different monomers in the polymer backbone and/or the polymer side chains as well as polymers consisting of identical monomers.

Thus, as an example, the polymer backbone may be formed as a homopolymer or as a copolymer in the comb polymer KP. Likewise the polymer side chains may be homopolymers and/or copolymers. It is also possible for individual side chains in the comb polymer KP to be embodied as homopolymers and for other side chains to also be present in the form of copolymers at the same time.

Backbone monomers and side chain monomers in the comb polymer KP are at least partially different in particular. The polymer backbone in particular consists entirely of monomers other than the side chains of the comb polymer KP. The comb polymer KP is present in the form of a copolymer in this case.

The polymer parameters N, n, P and z can be calculated according to individual steps or several of the following steps in particular:

i) Determination of the total number X of converted or present backbone monomers:

$$X = \sum_i n_{backbone\ monomer\ i},$$

where $n_i$ stands for the number of moles of the backbone monomer i. In the case of production of the comb polymers by copolymerization, the total number can be calculated from the respective mass of the converted backbone monomers ($m_i$) and their molecular weights ($M_i$) using the equation:

$$X = \sum_i \frac{m_i}{M_i}.$$

If the comb polymers are produced by a polymer-like reaction, then the total number of converted backbone monomers can be determined from the mass of backbone polymer used ($m_{backbone\ polymer}$) and the molecular weight of the backbone monomers ($M_{backbone\ monomer}$):

$$X = \frac{m_{backbone\ polymer}}{M_{backbone\ monomer}}.$$

In the case of a polymer backbone consisting of different backbone monomers, an average molecular weight can be used.

In both methods in particular, only the monomers and/or backbone polymers that are actually reacted to form comb polymers are taken into account. The corresponding proportions can be determined by size exclusion chromatography. In general, however, it is possible to achieve an almost complete conversion (>97% or better).

ii) Determining the total number of side chain polymers Y that are present or converted: If side chain polymers previously synthesized in the usual way are being used, then the number can be calculated directly from the mass of the side chain polymers used ($m_{side\ chain\ polymer}$) and their molecular weight ($M_{side\ chain\ monomer}$):

$$Y = \frac{m_{side\ chain\ polymer}}{M_{side\ chain\ monomer}}$$

If different side chain polymers are used at the same time, then Y represents a total accordingly. With respect to the side chain polymers, advantageously only the side chain polymers actually converted to comb polymers are taken into account.

iii) Calculation of N=X/Y (=average number of backbone monomers per side chain).

iv) Calculation of z (=average number of ionizable groups per side chain-free backbone monomer). To do so, the total number of ionizing groups on the backbone monomers is divided by the sum of the backbone monomers having no side chains.

v) Calculation of the molecular weight $M_S$ of a polymer segment consisting of a side chain and N backbone monomers. The respective proportional molecular weights are added up for this purpose.

vi) Determination of the number-average molecular weight $M_n$ of the comb polymer by size exclusion chromatography in particular, using pullulan as the standard, wherein $$M_n = \frac{\sum n_i M_i}{\sum n_i},$$

where $n_i$=number of molecules with weight $M_i$;

vii) Calculation of n=$M_n/M_S$ (=average number of side chains per comb polymer molecule).

viii) Determination of the average number of side chain monomers P. This is calculated in particular from the number-average molecular weight of the side chain polymers by dividing the average molecular weight of the side chain polymers by the molecular weight of the side chain monomer units.

Calculation of the polymer parameters is illustrated further below on the basis of exemplary embodiments.

The term "binder composition" is understood in the present case to refer in particular to a composition containing at least one mineral binder. The "alkaline activating agent" is in particular a substance having a basic or alkaline effect. This is understood in particular to be a substance capable of raising its pH when added to an aqueous solution. An alkaline activating agent is understood in particular to be a substance that is suitable for activation of the setting or hardening of latent hydraulic and/or puzzolanic binders.

The binder composition is an activated binder composition or an alkaline activated binder composition, which also contains an alkaline activating agent in addition to the binder. In particular the binder composition contains an activating agent for activation of a latent hydraulic and/or puzzolanic binder. The alkaline activated binder composition in particular has a higher pH than a similar binder composition, which is not activated or does not contain any alkaline activating agent. The alkaline activating agent may be present in free or dissolved form, e.g., as a salt and/or having reacted at least partially with the binder.

The term "latent hydraulic and/or puzzolanic binders" is used in the present context to refer in particular to binders which set or harden hydraulically due to the action of additives and/or activating agents. In particular these are reactive additives, in particular reactive additives of type II according to the EN 1045-2 standard.

The binder composition preferably contains or consists of a latent hydraulic and/or puzzolanic binder. Possible latent hydraulic and/or puzzolanic binders include in particular slags, puzzolans, fly ash, silica dust, volcanic ash, metakaolins, rice husks, burnt shale and/or calcined clay. Preferred latent hydraulic and/or puzzolanic binders comprise slags, puzzolans, fly ash and/or silica dust, with fly ash being especially preferred in the present case. Slag is also advantageous.

The binder composition is a cement or a binder composition that contains cement in particular. The amount of cement in the binder composition is in particular at least 5 wt %, in particular 5-95 wt %, preferably 60-80 wt %. A Portland cement, for example, is suitable as the cement, but calcium aluminate cements, Portland limestone cements and/or belite-rich sulfoaluminate cement, for example, may also be used.

In an advantageous embodiment, the binder composition contains in particular 5-95 wt %, in particular 15-50 wt %, especially preferably 20-40 wt % latent hydraulic and/or puzzolanic binder, plus 5-95 wt %, preferably 60-80 wt % hydraulic binder. The hydraulic binder is advantageously cement, in particular a Portland cement.

The binder composition may additionally or instead of the aforementioned components also contain, for example, other hydraulic binders, e.g., hydraulic lime. Likewise the binder composition may also contain non-hydraulic binders, for example, gypsum, anhydrite and/or white chalk.

In addition, the binder composition may contain inert substances, for example, pigments, limestone or powdered limestone. This is in combination with latent hydraulic and/or puzzolanic binders in particular. A portion of the latent hydraulic and/or puzzolanic binders may therefore be replaced by inert substances, e.g., limestone. The amount of inert substances is in particular 0.1-30 wt %, preferably 0.1-20 wt %, more preferably 0.1-15 wt %.

The activating agent advantageously comprises an alkali metal salt and/or an alkaline earth metal salt. It is an alkali metal hydroxide, an alkali metal carbonate and/or an alkali metal sulfate in particular. NaOH, KOH, $Na_2CO_3$ and/or $Na_2SO_4$ are preferred. An alkali metal hydroxide and/or an alkali metal carbonate is/are especially preferred. The activating agent is in particular NaOH and/or $Na_2CO_3$, preferably $Na_2CO_3$.

Such activating agents cause a particularly strong activation of the latent hydraulic and puzzolanic binders and at the same time are compatible with the comb polymers KP according to the invention. Thus, high early strength values can be achieved with good processability of the binder compositions at the same time. However, other activating agents may also be used in principle.

The concentration of the activating agent is advantageously 0.001-5 wt %, preferably 0.1-1.5 wt %, more preferably 0.5-1.5 wt %, each based on the weight of the latent hydraulic and/or puzzolanic binder.

The polymer backbone of the comb polymer KP contains in particular polymerized acrylic acid, methacrylic acid and/or maleic acid units. Polymethacrylic acid and/or maleic acid units are preferred, with maleic acid units being especially preferred.

The acrylic acid, methacrylic acid and/or maleic acid units at least partially have free acid groups or their salts. These function in particular as ionic groups. More preferably the acrylic acid, methacrylic acid and/or maleic acid units are partially in the form of ester and/or amide derivatives. Preferably at least a portion of the acrylic acid, methacrylic acid and/or maleic acid units have at least some of the side chains of the comb polymer.

According to a preferred embodiment, the polymer backbone consists of at least 40 mol %, in particular at least 50 mol % acrylic acid, methacrylic acid and/or maleic acid units.

According to another preferred embodiment, the polymer backbone contains polymerized vinyl, allyl and/or isoprenyl ether compounds. Vinyl, allyl and/or isoprenyl polyalkylene oxides are especially preferred. The polyoxyalkylene oxide units in particular form side chains of the comb polymer.

The polymer side chains of the comb polymer KP are hydrophilic in particular. The polymer side chains are preferably constructed from side chain monomers, which contain at least one heteroatom, in particular oxygen, in addition to C and H atoms.

In a preferred embodiment the side chains consist exclusively of C, O and H atoms.

The polymer side chains particularly advantageously comprise polyethers, in particular $C_2$ to $C_4$ polyalkylene oxides. Polymer side chains having at least 50 mol % polyethylene oxides, based on the total number of monomers in the side chain, are preferred in particular.

The polymer side chains, in particular polyalkylene oxides, are advantageously bound to the polymer backbone at least partially by means of an ester, ether and/or amide group.

It has been found that it is advantageous to have a ratio a) of the average total number of free acid groups, in particular COOH groups, their anions and salts, to b) the average number of side chains per comb polymer molecule, in the range of 2-5, in particular 3-4. In the present case, this ratio is also known as the C/E ratio. Comb polymers KP having such C/E ratios have proven to be particularly advantageous with regard to the best possible compatibility with alkaline activated binder compositions and a good liquefaction effect.

The term "free acid groups" is understood in particular to refer to acid groups, which have not been esterified, amidated or otherwise derivatized. However, the free acid groups may be in the form of anions in deprotonated form or as a salt with a counter ion or cation. The free acid groups include in particular carboxylic acid, sulfonic acid, phosphoric acid and/or phosphonic acid groups. Carboxylic acid groups are preferred. The free acid groups function as ionic or ionizable groups.

An average number-average total weight $M_n$ of the comb polymer KP may be, for example, in the range of 1,000-200,000 g/mol. Comb polymers KP with an average total weight $M_n$ of 1,000-20,000 g/mol, in particular 5,000-15,000 g/mol are preferred.

An average number-average total weight $M_n$ of the side groups may be in the range of 100-10,000 g/mol, for example. The average total weight is preferably 500-5,000 g/mol, in particular 800-3,000 g/mol, more preferably 1,000-2,000 g/mol.

In the present context, comb polymers with n=2-50, N=2-10 and/or P=10-100 have proven to be particularly preferred. Also preferred are n=3-10, N=3-6 and/or P=20-50. Such comb polymers in general have a surprisingly good compatibility with alkaline activated binder compositions and also have a good dispersing effect.

According to a particularly preferred embodiment, a comb polymer KP containing at least one polymerized maleic acid unit and at least one polymerized allyl ether polyalkylene oxide is used. Comb polymers KP containing polymerized methacrylic acid units may also be advantageous, wherein some of the methacrylic acid units have polyalkylene oxide side chains bound by means of an ester linkage.

The comb polymers KP used according to the invention have the following substructure units in particular:

a) $n_1$ substructure units S1 of the formula (I):

(I)

b) $n_2$ substructure units S2 of the formula (II):

(II)

c) $n_3$ substructure units S3 of the formula (III):

(III)

d) $n_4$ substructure units S4 of the formula (IV):

(IV)

e) optionally $n_5$ units of at least one additional structure unit S5;
wherein:
each $R^1$, $R^2$ and $R^3$, independently of one another, stands for H, COOM, CH$_2$COOM or an alkyl group with 1 to 5 carbon atoms,
each $R^4$, independently of one another, stands for —COOM, —CH$_2$COOM, —SO$_2$—OM, —O—PO(OM)$_2$ and/or —PO(OM)$_2$;
or wherein $R^3$ with $R^4$ forms a ring with to yield —CO—O—CO—;
wherein M stands for H, an alkali metal, an alkaline earth metal, ammonium, an ammonium cation, an organic ammonium compound or mixtures thereof;
and wherein additionally:
q=0, 1 or 2;
each Q, independently of one another, stands for —O—, —NH— and/or —HC═N—, and s=0 or 1;
each A, independently of one another, is a C$_2$ to C$_4$ alkylene with t=2-300;
each $R^5$, independently of one another, stands for H, a C$_1$ to C$_{20}$ alkyl group, cyclohexyl group or alkylaryl group;
each $R^6$, independently of one another, stands for a C$_1$ to C$_{20}$ alkyl group, cycloalkyl group, alkylaryl group or -[AO]$_t$—R$^5$;
each $R^7$, independently of one another, stands for —NH$_2$, —NR$^8$R$^9$, —OR$^{16}$NR$^{11}$R$^{12}$,
wherein $R^8$ and $R^9$, independently of one another, stand for
a C$_1$ to C$_{20}$ alkyl group, cycloalkyl group, alkylaryl group or aryl group,
or for a hydroxyalkyl group or for an acetoxyethyl (CH$_3$—CO—O—CH$_2$—CH$_2$—) group or a hydroxyisopropyl (HO—CH(CH$_3$)—CH$_2$—) group or an acetoxy-isopropyl (CH$_3$—CO—O—CH(CH$_3$)—CH$_2$—);
or $R^8$ and $R^9$ together form a ring of which the nitrogen is a part, to form a morpholine or imidazoline ring;
$R^{10}$ is a C$_2$-C$_4$ alkylene group,
$R^{11}$ and $R^{12}$, independently of one another, are each a C$_1$ to C$_{20}$ alkyl group, a cycloalkyl group, an alkylaryl group, aryl group or a hydroxyalkyl group,
and wherein $n_1$, $n_2$, $n_3$, $n_4$ and $n_5$ denote the average number of the respective substructure units S1, S2, S3, S4 and S5 in a molecule of the comb polymer KP, with $n_1/n_2/n_3/n_4/n_5=(0.1\text{-}0.9)/(0.1\text{-}0.9)/(0\text{-}0.8)/(0\text{-}0.8)/(0\text{-}0.8)$, preferably $n_1/n_2/n_3/n_4/n_5=(0.3\text{-}0.9)/(0.1\text{-}0.7)/(0\text{-}0.6)/(0\text{-}0.4)/0$.

The substructure unit S1 has a polymer side chain $[AO]_t$, comprised of t side chain monomers AO with oxygen as a heteroatom. If $R^6$ stands for $-[AO]_t-R^5$, then this is also true accordingly of the substructure unit S3. In principle, A, t and $R^5$ may be selected individually in the individual substructure units S1 and/or S3. For example, it is also possible for multiple substructure units S1 with different $-[AO]_t-R^5$ units to be present in one comb polymer. The same is also true of the substructure units S3.

The other substructure units S2 and S4 in particular do not have any polymer side chains composed of side chain monomers with heteroatoms.

Preferred embodiments with respect to the substructure unit S1 include the following:

A1) In at least one substructure unit S1, in particular in all substructure units S1, q=0, r=0 and s=1 and Q stands for —O— and/or B1) in at least one substructure unit S1, in particular in all substructure units S1, q=1, r=0 and s=1 and Q stands for —O— and/or C1) in at least one substructure unit S1, in particular in all substructure units S1, $R^1$ is a methyl group, q=2, r=0 and s=1 and Q stands for —O— and/or D1) in at least one substructure unit S1, in particular in all substructure units S1, $R^1$ is a methyl group, q=0, r=1 and s=1 and Q stands for —O—.

Independently thereof, $R^5$ in at least one substructure unit S1, in particular in all substructure units S1, preferably stands for a methyl group. A advantageously comprises a $C_2$ alkylene in at least one substructure unit S1, in particular in all substructure units S1. If $R^6$ stands for $-[AO]_t-R^5$, this also applies accordingly for the substructure unit S3.

In a preferred embodiment, $[AO]_t$ in at least one substructure unit S1, in particular in all substructure units S1, stands for a homopolymer of ethylene oxide. If $R^6$ stands for $[AO]_t-R^5$, then this also applies accordingly for the substructure units S3.

According to another advantageous embodiment, $[AO]_t$ in at least one substructure unit S1, in particular in all substructure units S1, stands for a copolymer of ethylene oxide and propylene oxide, wherein ethylene oxide advantageously has an amount of at least 50 mol %. The ethylene oxide and propylene oxide units may be arranged randomly or in blocks in each side chain, independently of one another. If $R^6$ stands for $[AO]_t-R^5$, this also applies accordingly to the substructure units S3.

Independently thereof, it has proven advantageous if t has a value of 10-120, in particular 15-70, more preferably 20-30, in at least one substructure unit S1, in particular in all substructure units S1. If $R^6$ stands for $[AO]_t-R^5$, then this also applies to the substructure units S3 accordingly.

Particularly preferred embodiments with respect to the substructure unit S2 include the following:

A2) In at least one substructure unit 52, in particular in all substructure units S2, $R^1$ and $R^3$ stands for hydrogen and $R^2$ stands for COOM and/or B2) In at least one substructure unit S2, in particular in all substructure units S2, $R^1$ stands for a methyl group and $R^2$ and $R^3$ stand for hydrogen and/or C2) In at least one substructure unit S2, in particular in all substructure units S2, $R^1$, and $R^2$ and $R^3$ stand for hydrogen.

Independently thereof, $R^4$ in at least one substructure unit S2, in particular in all substructure units S2, advantageously stands for COOM.

Particularly advantageous embodiments are combinations of substructure units S1 according to variant B1) and substructure units S2 according to variant A2).

Combinations of substructure units S1 according to variant D1) and substructure units S2 according to variant B2), in which $R^4$=COOM are also advantageous embodiments.

The additional structure unit S5 may be, for example, a polymerized ethylenically unsaturated hydrocarbon compound.

In addition, it has proven advantageous if $n_1=2\text{-}30$, $n_2=0.1\text{-}50$, $n_3=0\text{-}25$, $n_4=0\text{-}25$ and $n_5=0\text{-}15$. Even more advantageously, $n_1=2\text{-}30$, $n_2=0.1\text{-}50$, $n_3=0.001\text{-}25$, $n_4=0$ and $n_5=0$.

The substructure units S1, S2, S3, S4 and S5 advantageously form at least 90 mol %, more preferably at least 95 mol % of the total molar amount of the comb polymer KP.

In addition, it is possible to use a mixture of two chemically and/or structurally different comb polymers KP.

Another aspect of the invention relates to a binder composition containing a mineral binder and an alkaline activating agent as well as a comb polymer KP, defined as indicated above. Furthermore, the binder composition contains in particular a latent hydraulic and/or puzzolanic binder. The activating agent is advantageously an activating agent as described above, in particular for latent hydraulic and/or puzzolanic binders. Such binder compositions can be used, for example, together with aggregates such as sand, gravel and/or pulverized rock for production of water and/or concrete.

It has been found that aqueous slurries of such binder compositions can be processed well even with a high proportion of latent and/or puzzolanic binders. Furthermore, adequate early strength values and high strength are achieved after hardening of the binder compositions.

Molded bodies can be obtained accordingly by hardening such binder compositions after adding water. These molded bodies may in principle be shaped in any way and may be part of a construction, for example, a building or a bridge.

Another aspect of the present invention relates to a method for preparing a binder composition. In doing so, a mineral binder, which contains a latent hydraulic and/or puzzolanic binder in particular, is mixed with a comb polymer KP as described above and an alkaline or basic activating agent.

According to a preferred method, the preparation water for the binder composition is premixed with the activating agent and then the comb polymer KP is mixed in. In a subsequent step, the preparation water containing the comb polymer and optionally the activating agent is mixed with the binder. This has proven advantageous with respect to the best possible efficacy of the comb polymer KP in the binder composition.

However, in principle it is also possible to first mix the activating agent with the mineral binder, for example, with a portion of the preparation water and then subsequently mix in the comb polymer, for example, with another portion of the preparation water.

In addition, it may be advantageous to mix in at least a portion of the comb polymer KP, in particular all of the comb polymer KP, before and/or during a milling operation of the mineral binder, for example, a hydraulic, latent hydraulic or puzzolanic binder.

Regardless of that, it may also be preferable to add in at least a portion of the activating agent, in particular all of the activating agent, before and/or during a milling operation on the mineral binder. Optionally both the comb polymer and the activating agent may be added at least partially before and/or during the milling operation.

These types of addition may in particular simplify the handling in the preparation of binder compositions and may optionally have a positive influence on the milling process.

EXEMPLARY EMBODIMENTS

1. Comb Polymers 1.1 Preparation Example for Comb Polymer P1 (Copolymerization)

250 g water, 81 g (0.7 mol) maleic acid, 560 g (0.51 mol) of an allyl-polyethylene glycol ether (polyglycol A 1100, Clariant; methoxy-terminated polyethylene glycol with $M_n$=1,100), 20.6 g (0.24 mol), vinyl acetate, 2 g sodium hypophosphite and 1.5 g of a 10% aqueous solution of Fe(II)-$SO_4$ are placed in a reaction vessel equipped with an agitator, thermometer and reflux condenser.

Then the temperature is brought to 25° C. Next, over a period of 150 minutes, a solution of 17 g hydrogen peroxide (35% in 43 g water; feed 1) and a solution of 6.5 g Rongalit in 60 g water (feed 2) are each added by drops while the temperature is kept between 30° C. and 35° C. After the addition is complete, stirring is continued for 30 minutes more, yielding a colorless, viscous, slightly cloudy solution with a solids content of 63.6%.

The comb polymer produced in this way with copolymerized maleic acid/allyl ether/vinyl acetate backbone and one-sided methoxy-terminated polyethylene glycol ether side chains is referred to below as comb polymer P1. The MPEG side chains are bound by ether linkages to the polymer backbone.

1.2 Production Example for Comb Polymer P2 (Polymer-Like Reaction)

240 g (0.0172 mol) polymethacrylic acid (35.8% in water) with an average molecular weight of 5,000 g/mol is placed in a reaction vessel equipped with an agitator, thermometer and vacuum connection plus a distillation unit (a polymethacrylic acid molecule has approx. 58 methacrylic acid monomer molecules accordingly). While stirring, 2.5 g 50% sulfuric acid is added. Next 222 g (0.222 mol) of a polyethylene glycol capped at one end with a methoxy end group (hereinafter referred to as MPEG) and having an average molecular weight $M_w$=1,000 g/mol is added. The reaction mixture is then heated slowly to 165° C. while stirring, as water is distilled off continuously. The reaction mixture is kept at 165° C. for 30 minutes and then a vacuum of 80-100 mbar is applied and the temperature is raised to 175° C. The reaction mixture is esterified until the polymer content is >97% according to UPLC (ultra-performance liquid chromatography), which usually takes 2-3 hours.

The comb polymer with a polymethacrylate backbone and MPEG side chains produced in this way is referred to below as comb polymer P2. The MPEG side chains are bound to the polymer backbone by ester linkages.

1.3 Production of Comb Polymer P3

Comb polymer P3 was produced essentially the same as comb polymer P1 but 1.0 mol of the allyl polyethylene glycol ether (polyglycol A 1100), 2.0 mol maleic acid and no vinyl acetate were used. Comb polymer P3 accordingly has a copolymerized maleic acid/allyl ether backbone and methoxy-terminated polyethylene glycol ether side chains at one end, bound to the backbone by ether linkages.

1.4 Production of Comb Polymer P4

Comb polymer P4 was also produced by essentially the same method as comb polymer P1, but 0.3 mol of the allyl polyethylene glycol ether (polyglycol A 1100), 0.45 mol maleic acid and 0.15 mol vinyl acetate were used. Comb polymer P4 accordingly has a copolymerized maleic acid/allyl ether/vinyl acetate backbone and methoxy-terminated polyethylene glycol ether side chains at one end, bound to the backbone by ether linkages.

1.5 Production of Comb Polymer P5

Comb polymer P4 was produced by the same method as comb polymer P1, but 3.3 mol methacrylic acid and 1.0 mol of an ester of methacrylic acid and a polyethylene glycol ether ($M_n$=1,000 g/mol), methoxy-terminated) were copolymerized. Comb polymer P5 has a copolymerized methacrylic acid/methacrylic ester backbone accordingly and methoxy-terminated polyethylene glycol ether side chains at one end, bound to the backbone by ether linkages.

1.6 Production of Comb Polymer P6

Comb polymer P6 was produced the same as comb polymer P2 (see section 1.2) using the same polymethacrylic acid in the same amount as in the case of comb polymer P2. Instead of 222 g of the polyethylene glycol ($M_n$=1,000 g/mol) capped at one end with a methoxy terminal group, however, only 120 g was reacted. Comb polymer P6 thus has a polymethacrylate backbone and MPEG side chains, which are bound to the backbone by ester linkages.

1.7 Production of Comb Polymer P7

Comb polymer P7 was also produced essentially like comb polymer P2 using the same polymethacrylic acid in the same amount as in the case of comb polymer P2. However, 370 g was reacted instead of 222 g of the polyethylene glycol ($M_n$=1,000 g/mol) capped at one end with a terminal methoxy group. Comb polymer P7 thus has a polymethacrylate backbone and MPEG side chains, which are bound to the backbone by ester linkages.

1.8 Production of Comb Polymer P8

Comb polymer P8 was produced like comb polymer P2 but a poly(meth)acrylic acid consisting of 0.5 mol acrylic acid monomer and 0.5 mol methacrylic acid monomer with 0.18 mol of the polyethylene glycol ether was reacted with an average molecular weight of 3,000 g/mol in a polymer-like reaction (as described in P2). Comb polymer P8 thus has a mixed polymethacrylate backbone and MPEG side chains, which are bound to the backbone by ester linkages.

1.9 Production of Comb Polymer P9

Comb polymer P9 was also produced like comb polymer P2 by a polymer-like reaction in which polymethacrylic acid (containing a total of 1.0 mol methacrylic acid monomer) was reacted with 0.360 mol of an MPEG (average molecular weight $M_w$=1,000 g/mol) methoxy-terminated at one end and 0.002 mol of a polyalkylene oxide with an amine functionalization at one end and methoxy termination at one end (50 mol % ethylene oxide units and 50 mol % propylene oxide units; average molecular weight $M_n$=2,000 g/mol). Additional information on production can be found in EP 1 138 697 A1 or WO 03/080714, for example. Comb polymer P9 thus has a polymethacrylate backbone and different MPEG side chains, which are bound to the backbone by ester linkages and amide linkages.

1.10 Determination of Molecular Weight

The weights of the comb polymers P1-P9 produced were determined by size exclusion chromatography; (also known as gel-permeation chromatography, GPC). This technique is familiar to those skilled in the art and allows a determination of the molecular weights.

In the present case, the following system was used for the size exclusion chromatography:

Autosampler: Waters 717 Autosampler

Pump: Varian Pro Star

Detector: Varian RI-4 and Waters 2998 PDA

Columns: Suprema 30 Å+1000 Å+1000 Å

The eluent used with 0.1N $NaNO_3$ solution (17 g $NaNO_3$ to 1000 mL $H_2O$), which was adjusted to a pH of 12 with 2N NaOH.

The measurements were performed isocratically (composition of the eluent and concentration of the flow agent remain constant) at a flow rate of 0.8 mL/min and an injection quantity of 50 μL.

Pullulan was used as the standard for calibration (for comb polymers) and polyacrylic acid (for backbone polymers) was used at a concentration of 0.5-2 mg/mL.

For a sample preparation, the sample to be analyzed was dissolved in the eluent at a concentration of approx. 10 mg/mL.

Figure 1:
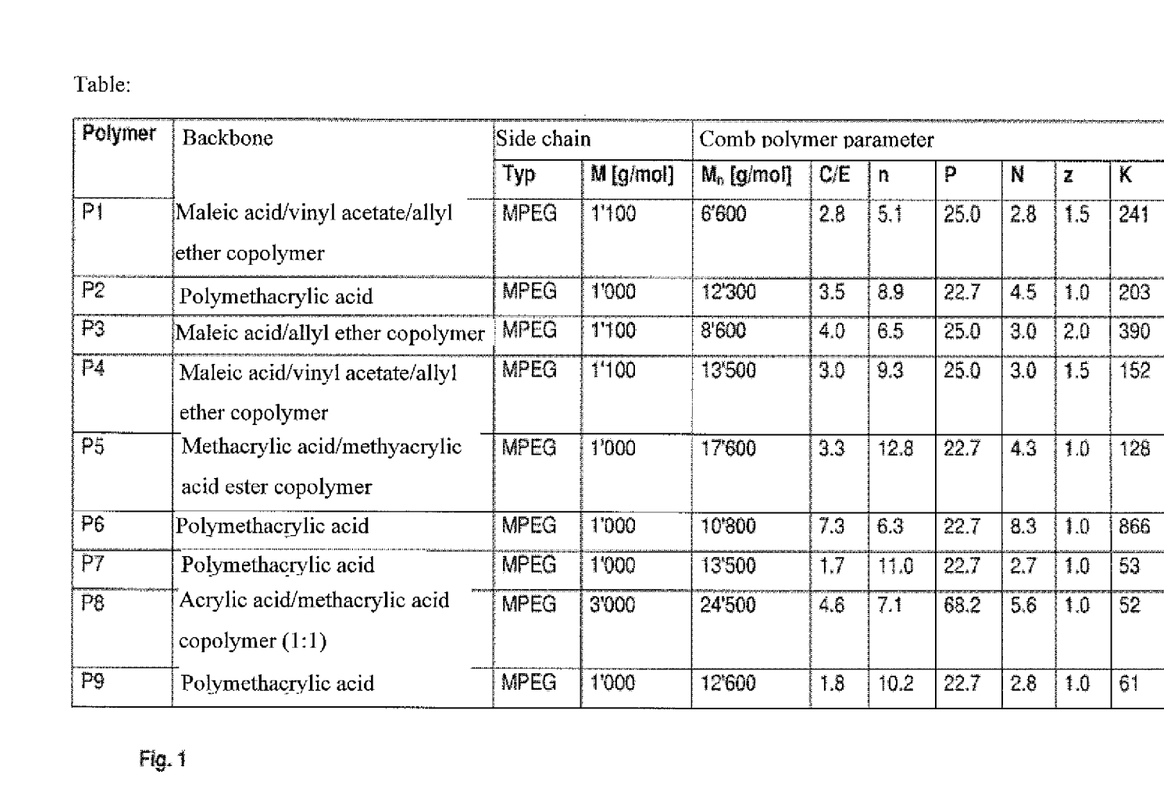
FIG. 1 A table giving an overview of the properties and parameters of the comb polymers used.
Figure 2:
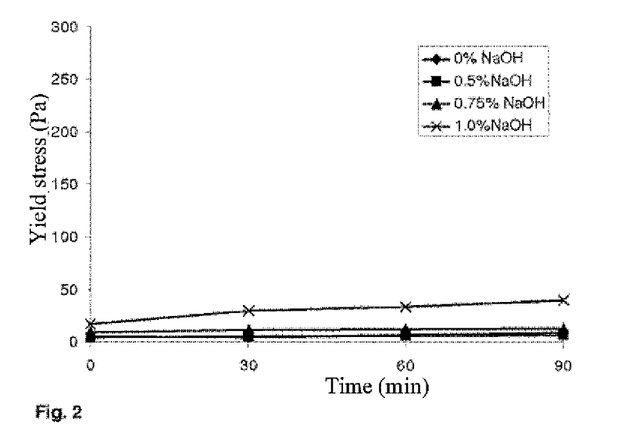
FIGS. 2-5 The trends in the yield stresses of binder compositions containing a cement/fly ash binder (water/binder ratio=0.33) and a comb polymer in each as a dispersant at various concentrations of activating agent (NaOH), shown as a function of time.
Figure 3:
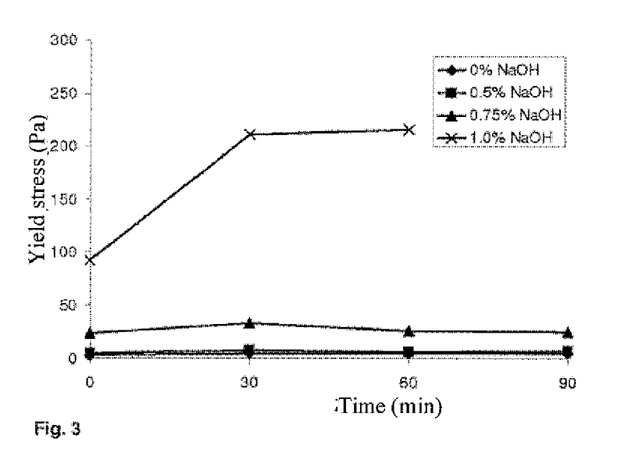
Figure 4:
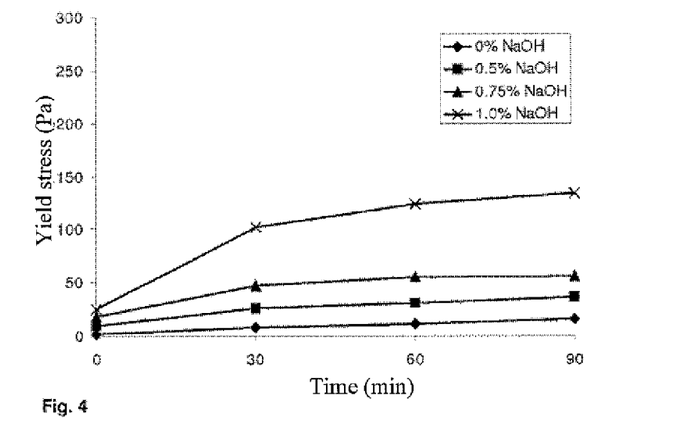

The molecular weights of the comb polymers P1-P9 determined in this way are listed in Table 1.

2. Determination of the Polymer Parameters

2.1 Comb Polymer P1

The parameters C/E, N, n, P and z of the comb polymer P1 can be determined as follows from the information in section 1.1 and the respective molecular weight in Table A:

The C/E ratio (acid groups to side chains) is calculated as follows:

$$C/E = \frac{2n(\text{maleic acid})}{n(\text{allyl ether})} = \frac{2 \cdot 0.7 \text{ mol}}{0.51 \text{ mol}} = 2.7$$

The factor 2 takes into account the two acid groups per maleic acid monomer.

The average number of backbone monomers per side chain (N) can be calculated as follows:

$$N = \frac{n(\text{maleic acid}) + n(\text{vinyl acetate}) + n(\text{allyl ether})}{n(\text{allyl ether})} =$$

$$\frac{0.7 \text{ mol} + 0.24 \text{ mol} + 0.51 \text{ mol}}{0.51 \text{ mol}} = 2.84$$

This yields, when represented as the average number of ionizable groups per backbone monomer (z), based on the backbone monomers having no side chains:

$$z = \frac{2n(\text{maleic acid}) + 0 \cdot n(\text{vinyl acetate})}{n(\text{maleic acid}) + n(\text{vinyl acetate})} =$$

$$\frac{2 \cdot 0.7 \text{ mol} + 0}{0.7 \text{ mol} + 0.24 \text{ mol}} = \frac{1.4 \text{ mol}}{0.94 \text{ mol}} = 1.5$$

The factor 2 again takes into account the two acid groups per maleic acid molecule, while the factor 0 takes into account the fact that vinyl acetate does not have any ionizable groups.

The average number of side chain monomers per side chain (P) is $$P = \frac{M(\text{allyl ether})}{M(\text{ethylene oxide})} = \frac{1100 \text{ g/mol}}{44 \text{ g/mol}} = 25.0$$

This is because allyl ether consists essentially of ethylene oxide monomers.

A polymer segment consisting of one side chain and the respective backbone monomers then has the following mass [M(segment)]:

$$M(\text{Segment}) = \frac{1}{n(\text{allyl ether})} \cdot \begin{bmatrix} n(\text{allyl ether}) \cdot M(\text{allyl ether}) + \\ n(\text{maleic acid}) \cdot M(\text{maleic acid}) + \\ n(\text{vinyl acetate}) \cdot M(\text{vinyl acetate}) \end{bmatrix}$$

$$= \frac{0.51 \text{ mol} \cdot 1100 \text{ g/mol} + 0.7 \text{ mol} \cdot 116.1 \text{ g/mol} + 0.24 \text{ mol} \cdot 86.1 \text{ g/mol}}{0.51 \text{ mol}}$$

$$= 1300 \text{ g/mol}$$

The average number of side chains per comb polymer molecule (n) or the average number of segments per comb polymer molecule can be calculated from this based on the average molecular weight of a comb polymer ($M_n$, see Table 1):

$$n = \frac{M_n(\text{comb polymer } P1)}{M(\text{Segment})} = \frac{6600 \text{ g/mol}}{1300 \text{ g/mol}} = 5.07$$

Finally, the structure constant K can be determined from the parameters N, n, P and z:

$$K_{P1} = \frac{[(N-1)z]^2}{nP^{9/5}N^{3/5}} \times 10^5 = \frac{[(2.84-1)\cdot 1.5]^2}{(5.07\cdot 25.0)^{9/5}\cdot 2.84^{3/5}} \times 10^5 = 241$$

2.2 Comb Polymer P2

The corresponding parameters C/E, N, n, P and z of the comb polymer P2 can be determined as follows from the information given in section 1.2 and the respective molecular weight in Table 1:

The polymethacrylic acid used here has the molecular weight M (polymethacrylic acid)=5,000 g/mol. The molecular weight of a methacrylic acid monomer is 86.1 g/mol here. One molecule of polymethacrylic acid consists of an average of 58.1 methacrylic acid monomer molecules accordingly.

Since 0.0172 mol pure polymethacrylic acid was used, the total amount of methacrylic acid monomers is n(methacrylic acid monomer)=n(polymethacrylic acid)·58.1=0.0172 mol·58.1=1.0 mol The C/E ratio (acid groups to side chains) is calculated as follows:

$$C/E = \frac{n(\text{methacrylic acid monomers}) - n(MPEG)}{n(MPEG)} = \frac{1.0 \text{ mol} - 0.222 \text{ mol}}{0.222 \text{ mol}} = 3.50$$

The methacrylic acid monomers, which are esterified with the MPEG side chains, reduce the number of free acid groups accordingly.

The average number of backbone monomers per side chain (N) can now be calculated as follows:

$$N = \frac{n(\text{methacrylic acid monomers})}{n(MPEG)} = \frac{1.0 \text{ mol}}{0.222 \text{ mol}} = 4.50$$

The MPEG side chains are added onto the existing polymer backbone in the polymer-like reaction, so they do not contribute to the backbone monomers and are not present in the numerator accordingly (not equal to the comb polymer P1 produced by copolymerization).

This yields as the average number of ionizable groups per backbone monomer (z) based on the backbone monomers that do not have any side chains:

$$z = \frac{n(\text{methacrylic acid monomers}) - n(MPEG)}{n(\text{methacrylic acid monomers}) - n(MPEG)} = 1$$

The average number of side chain monomers per side chain (P) is $$P = \frac{M(MPEG)}{M(\text{ethylene oxide})} = \frac{1000 \text{ g/mol}}{44 \text{ g/mol}} = 22.7$$

This is because the MPEG side chain consists mainly of ethylene oxide.

A polymer segment consisting of a side chain and the respective backbone monomers then has the following mass [M (segment)]:

$$M(\text{Segment}) = \frac{1}{n(MPEG)} \cdot \begin{bmatrix} n(\text{methacrylic acid monomers})\cdot \\ M(\text{methacrylic acid monomers}) + \\ n(MPEG)\cdot M(MPEG) \end{bmatrix}$$

$$= \frac{1.0 \text{ mol}\cdot 86.1 \text{ g/mol} + 0.222 \text{ mol}\cdot 1000 \text{ g/mol}}{0.222 \text{ mol}}$$

$$= 1388 \text{ g/mol}$$

It is possible to calculate from this the average number of side chains per comb polymer (n) or the average number of segments per comb polymer molecule from the average molecular weight of a comb polymer ($M_n$):

$$n = \frac{M_n(\text{comb polymer } P2)}{M(\text{Segment})} = \frac{12300 \text{ g/mol}}{1388 \text{ g/mol}} = 8.9$$

Finally, the structure constant K can be determined from the parameters N, n, P and z:

$$K_{P2} = \frac{[(N-1)z]^2}{nP^{9/5}N^{3/5}} \times 10^5 = \frac{[(4.50-1)\cdot 1]^2}{(8.9\cdot 22.7)^{9/5}\cdot 4.50^{3/5}} \times 10^5 = 203$$

2.3 Comb Polymers P3-P9

The corresponding parameters C/E, N, n, P and z of the comb polymers P3-P9 can be calculated on the basis of the data given in sections 1.3-1.9 and the respective molecular weights from Table 1 in the same way as done with the comb polymers P1 and/or P2. Table 1 gives an overview of the corresponding parameters of the comb polymers P3-P9,

3. Binders

For the tests, traditional Portland cement CEM I 42.5 N according to EN 197-1 with a density of 3.1 g/cm³ was used as the hydraulic binder.

Unless otherwise indicated, fly ash of the Safament type according to EN 450 with a density of 2.3 g/cm³ was used as the puzzolanic binder.

Löruns-type slag according to EN 450 was used as the latent hydraulic binder.

4. Production of Binder Compositions

Binder compositions consisting of 60-80 wt % cement, 20-40 wt % latent hydraulic or puzzolanic binder (e.g., fly ash or slag) were prepared by known methods with a water/binder ratio of 0.33. In the water/binder ratio, the binder contains both the cement and the latent hydraulic or puzzolanic binder.

A comb polymer KP and/or a basic activating agent (NaOH, KOH $Na_2CO_3$ or $Na_2SO_4$) were mixed into the preparation water before it was added to the binder. If both a comb polymer KP and a basic activating agent were added, the basic activating agent was added to the preparation water before adding the comb polymer KP.

The dosing of the comb polymer was selected so that, without adding the activating agent, a flow diameter of approx. 180 mm was achieved (cf. section 5). Thus any rheological deviations between different samples are equalized. In concrete terms, the comb polymer was dosed in an amount of 0.10-0.26 wt %, based on the total weight of the binder (cement plus latent hydraulic and puzzolanic binder).

The activating agent was used in an amount of 0.5-1 wt %, based on the total weight of the binder (cement plus latent hydraulic and puzzolanic binder).

The volume of the finished binder compositions including the preparation water and any additives (comb polymer and/or activating agent) was always 500 mL.

5. Test Method for Determining the Influence of the Activating Agent on the Comb Polymer To determine the yield stress or dimensional change strength of the binder composition, flow tests to determine the flow diameter of the freshly prepared binder compositions were performed in a first step. To do so, a hollow cylinder with a volume of 99 cm³, open on both sides and standing on a flat glass plate, was filled with freshly prepared binder composition and then pulled away vertically. After the end of the spreading movement, the diameter of the binder composition that had spread out in the plane of the glass plate and/or horizontally was measured. Unless otherwise indicated, the measurements were performed approx. 1 minute after preparation of the binder compositions.

The yield stress or the resistance to deformation of the binder composition was determined according to the equation (ii) from the volume V of the binder composition, the density ρ (=weighed mass of the binder composition/volume V) and the measured diameter d (=2 R):

$$\tau_0 = \frac{\frac{225 \cdot \rho \cdot g \cdot V^2}{128 \cdot \pi^2 \cdot R^5}}{1 + \frac{225 \cdot 3^{1/2} \cdot V}{128 \cdot \pi \cdot R^3}} - \frac{\lambda \cdot R^2}{V} \quad \text{(ii)}$$

where g is the acceleration due to gravity and λ is a constant coefficient for the test setup, which depends on the surface tension and the contact angle of the binder composition on the test surface. In the present case, λ=0.005 can be used for the calculation. Details about equation (ii) and/or A can be found in J. Zimmermann, C. Hampel, C. Kurz, L. Frunz, and R. J. Flatt, "*Effect of polymer structure on the sulphate-polycarboxylate competition*," Proc. 9th ACI Int. Conf. Superplasticizers and Other Chemical Admixtures in Concrete, (editors: T. C. Holland, P. R. Gupta, V. M. Malhotra), American Concrete Institute, Detroit, SP-262-12 (2009) pp. 165-176 as well as the references cited therein.

To determine the influence of the activating agent on the comb polymers KP in the binder compositions, the yield stress of a binder composition was determined with the comb polymer KP but without the activating agent (referred to as $\tau_{KP}$) and was compared with the yield stress of a corresponding composition with the comb polymer KP and the activating agent (e.g., NaOH) (referred to as $\tau_{OH}$).

To do so, the coefficient of the relative change in yield stress $\Delta\tau_{rel}$ was calculated according to formula (iii):

$$\Delta\tau_{rel} = \frac{\tau_{OH} - \tau_{KP}}{\tau_{OH}} \quad \text{(iii)}$$

If $\tau_{OH} \gg \tau_{KP}$, then $\Delta\tau_{rel}$ tends toward 1. In this case, the activating agent has a strongly negative influence on the effect of the comb polymer KP.

However, if $\tau_{OH} \approx \tau_{KP}$, then $\Delta\tau_{rel}$ tends toward 0. In this case, the activating agent has hardly any negative effect on the action of the comb polymer KP. As this shows, $\Delta\tau_{rel} < 0.90$ is preferred, or more preferably, $\Delta\tau_{rel} < 0.75$, even more preferably $\Delta\tau_{rel} < 0.6$.

6. Tests

6.1 Properties of Various Comb Polymers in Binder Compositions with Alkaline Activating Agents Various binder compositions were prepared with and without activating agent. In Table 1 the yield stresses $\tau_{KP}$ (without activating agent) and $\tau_{OH}$ (with activating agent) and the changes in yield stress A $\Delta\tau_{rel}$ of binder compositions with various comb polymers KP are compared with one another. The binder compositions used are essentially identical except for the comb polymer KP used in each case and contain 70% cement and 30% fly ash as the binder components. NaOH is used in a concentration of 0.5 wt % as the activating agent.

TABLE 1

| Polymer | K | C/E | Dosing [wt %] | $\tau_{KP}$ [Pa] | $\tau_{OH}$ [Pa] | $\Delta\tau_{rel}$ [Pa] |
|---|---|---|---|---|---|---|
| P1 | 241 | 2.8 | 0.13 | 5.2 | 4.5 | −0.16 |
| P2 | 203 | 3.5 | 0.13 | 3.4 | 5.1 | 0.33 |
| P3 | 390 | 4.0 | 0.13 | 6.7 | 11.4 | 0.41 |
| P4 | 152 | 3.0 | 0.11 | 5.4 | 12.1 | 0.55 |
| P5 | 128 | 3.3 | 0.11 | 6.1 | 23.7 | 0.74 |
| P6 | 866 | 7.3 | 0.10 | 1.3 | 9.1 | 0.86 |
| P7 | 53 | 1.7 | 0.22 | 4 | 61 | 0.93 |
| P8 | 52 | 4.6 | 0.11 | 0.8 | 11.1 | 0.93 |
| P9 | 61 | 1.8 | 0.12 | 3.7 | 184.1 | 0.98 |

Polymers P1-P6 all have a K value of >70 and have a change in yield stress $\Delta\tau_{rel} < 0.90$ in the binder compositions. Such polymers are thus at least partially able to resist the alkaline conditions in the binder composition. Polymers P1-P5, which yield $\Delta\tau_{rel} < 0.75$, are especially suitable. Even more suitable are the polymers P1-P4, which have $\Delta\tau_{rel} < 0.6$. As found in practical experiments, binder compositions $\Delta\tau_{rel} < 0.6$ in particular can be processed with no problem.

Polymers P7-P9 with a K value in the range of 52-61 exhibit yield stress changes of $\Delta\tau_{rel} < 0.90$ in the binder compositions. Accordingly, these polymers are influenced strongly by the activating agent and therefore are not very suitable for alkaline activated binder compositions.

6.2 Trend in the Yield Stress Over Time at Various NaOH Concentrations

FIGS. 2-5 show the trends in the yield stress over time for the polymers P1 (FIG. 2), P2 (FIG. 3), P6 (FIG. 4) and P7 (FIG. 5) graphically for various NaOH concentrations. The yield stress $\tau_{KP}$ (without activating agent) and $\tau_{OH}$ (with activating agent) of binder compositions with the NaOH concentrations indicated between 0.5 and 1 wt % were measured after 30, 60 and 90 minutes.

As shown in FIGS. 2-5, the polymers P1, P2 and P6 are relatively insensitive up to an activating agent (NaOH) concentration of 0.75 wt %. Even after 90 minutes, the yield stress with these polymers is in the range of max. 50 Pa. In the case of polymers P1 and P2, the yield stress is even largely constant below approx. 30 Pa. Especially noteworthy is polymer P1 with which the yield stress remains constant below approx. 15 Pa even after 90 minutes and 0.75 wt % activating agent. Furthermore, the yield stress with polymer P1 remains constant below 40 Pa for 90 minutes with 1.0 wt % activating agent.

Figure 5:
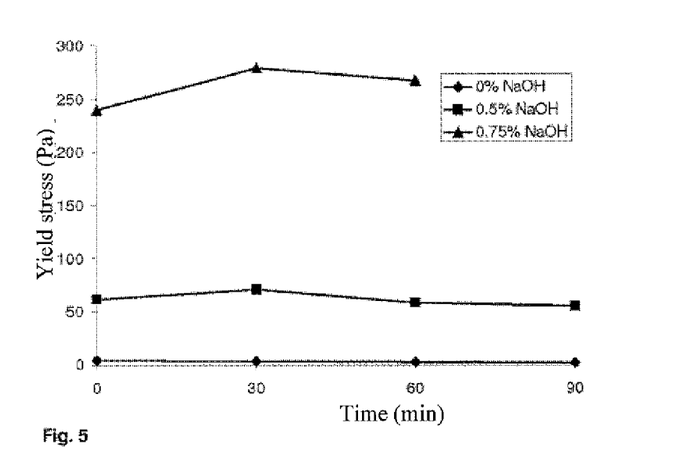

Although polymer P7 without activating agent has a good liquefaction effect, the yield stress increases to more than 50 Pa even at concentrations of 0.5 wt % NaOH. At 0.75 wt % NaOH, it is even in the range of approx. 250 Pa. Polymer P7 is thus highly sensitive to the activating agent and therefore is hardly suitable for binder compositions containing an alkaline activating agent.

6.3 Variation in the Fly Ash Content

In addition, binder compositions with various fly ash amounts were prepared. Table 2 shows the influence of the fly ash content in the binder composition on the basis of the yield stress $\tau_{KP}$, $\tau_{OH}$ and the changes in yield stress $\Delta\tau_{rel}$ for the two polymers P1 and P6. NaOH is used as the activating agent in a concentration of 0.5 wt %.

TABLE 2

| Polymer | Dosing [wt %] | Amount of fly ash/cement [wt %] | $\tau_{KP}$ [Pa] | $\tau_{OH}$ [Pa] | $\Delta\tau_{rel}$ [Pa] |
|---|---|---|---|---|---|
| P1 | 0.13 | 20/80 | 4.5 | 4.1 | −0.10 |
|    | 0.13 | 30/70 | 5.2 | 4.5 | −0.16 |
|    | 0.13 | 40/60 | 5.1 | 3.7 | −0.38 |
| P6 | 0.26 | 20/80 | 3.9 | 45.6 | 0.92 |
|    | 0.22 | 30/70 | 4.0 | 61.0 | 0.93 |
|    | 0.22 | 40/60 | 2.4 | 116.8 | 0.98 |

The results in Table 2 show in particular that the fly ash content of the binder compositions with polymer P1 can be varied in a wide range without significantly impairing the effect of the polymer.

6.4 Variation in the Type of Fly Ash

Tests were also conducted with various types of fly ash. Table 3 shows a comparison of two different types of fly ash in the binder composition on the basis of the yield stress $\tau_{KP}$, $\tau_{OH}$ and the change in yield stress $\Delta\tau_{rel}$ for the two polymers P1 and P6, using as the binder components 70% cement and 30% fly ash of the given type in each case. NaOH in a concentration of 0.5 wt % was used as the activating agent.

TABLE 3

| Polymer | Dosing [wt %] | Type of fly ash | $\tau_{KP}$ [Pa] | $\tau_{OH}$ [Pa] | $\Delta\tau_{rel}$ [Pa] |
|---|---|---|---|---|---|
| P1 | 0.13 | Safament | 5.2 | 4.5 | −0.16 |
|    |      | Hydrolment | 3.4 | 3.6 | 0.06 |
| P6 | 0.22 | Safament | 4.0 | 61.0 | 0.93 |
|    |      | Hydrolment | 2.9 | 49.9 | 0.94 |

The results for various types of fly ash are in qualitative agreement.

6.5 Variation of the Latent Hydraulic Binder

In the tests summarized in Table 4, Löruns-type slag was used instead of fly ash, and the yield stress $\tau_{KP}$, $\tau_{OH}$ and the change in yield stress $\Delta\tau_{rel}$ were determined for the two polymers P1 and P6 in corresponding binder compositions using 70% cement and 30% slag as the binder components. NaOH in a concentration of 0.5 wt % was used as the activating agent.

TABLE 4

| Polymer | Dosing [wt %] | Amount of cement/slag [wt %] | $\tau_{KP}$ [Pa] | $\tau_{OH}$ [Pa] | $\Delta\tau_{rel}$ [Pa] |
|---|---|---|---|---|---|
| P1 | 0.13 | 70/30 | 1.8 | 2.3 | 0.24 |
| P6 | 0.22 | 70/30 | 3.4 | 255.6 | 0.99 |

The results for the cement/slag binder system are in qualitative agreement with the results for the cement/fly ash binder system.

6.6 Variation of the Activating Agent

In addition, tests of various activating agents were conducted in which the yield stresses $\tau_{KP}$, $\tau_{OH}$ and the changes in yield stress $\Delta\tau_{rel}$ were determined for the two polymers P1 and P6 in binder compositions with 70% cement and 30% slag and the activating agents listed in Table 5. The activating agents were used in a concentration of 0.5 wt %.

TABLE 5

| | | Polymer | |
|---|---|---|---|
| Activator | | P1 | P6 |
| — | $\tau_{KP}$ [Pa] | 5.2 | 4.0 |
| NaOH | $\tau_{OH}$ [Pa] | 4.5 | 61.0 |
|  | $\Delta\tau_{rel}$ [Pa] | −0.16 | 0.93 |
| KOH | $\tau_{OH}$ [Pa] | 5.5 | 49.9 |
|  | $\Delta\tau_{rel}$ [Pa] | 0.04 | 0.92 |
| $Na_2CO_3$ | $\tau_{OH}$ [Pa] | 1.9 | >304 |
|  | $\Delta\tau_{rel}$ [Pa] | −1.8 | 1.0 |
| $Na_2SO_4$ | $\tau_{OH}$ [Pa] | 8.4 | 127.7 |
|  | $\Delta\tau_{rel}$ [Pa] | 0.4 | 1.0 |

Table 5 shows that the comb polymers can be used with different activating agents.

6.7 Calorimetric Measurements

Figure 6:
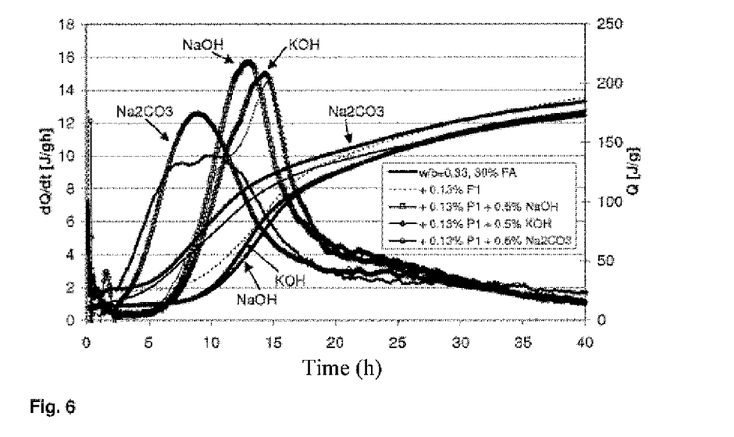
FIG. 6 A comparison of the course of the relative heat evolution of various binder compositions containing a cement/fly ash binder, a dispersant (comb polymer) and various activating agents (NaOH, KOH, $Na_2CO_3$) as a function of time.

FIG. 6 shows the curve of the relative development of heat over time (measured at room temperature in an insulated measurement cell) of binder compositions containing a cement/fly ash binder (i) without additive agents, (ii) with dispersant (comb polymer P1) and (iii) with dispersant (comb polymer P1) and various activating agents (NaOH, KOH, $Na_2CO_3$) in the concentrations indicated. The left ordinate shows the heat flow dQ/dt, while the right ordinate shows the cumulative quantity of heat Q. The binder components used were 70% cement and 30% fly ash (water/binder ratio=0.33).

It can be seen from FIG. 6 that addition of the comb polymer P1 (without addition of activating agent) shifts the peak in the heat flow (dQ/dt) toward later times in comparison with a binder composition without additive. The cumulative heat also increases more slowly accordingly. This may be interpreted to mean that the early strength of the binder composition containing dispersant is reduced in comparison with the binder composition without additive.

The additional addition of activating agents (NaOH, KOH, $Na_2CO_3$) can reduce this influence of comb polymer P1 and/or of the dispersant at least to some extent. The peaks in the heat flows (dQ/dt) are shifted toward earlier times in this case.

Higher early strength values are thus achieved with the activating agents accordingly. As FIG. 6 shows, the use of Na$_2$CO$_3$ is particularly advantageous in this regard.

Figure 7:
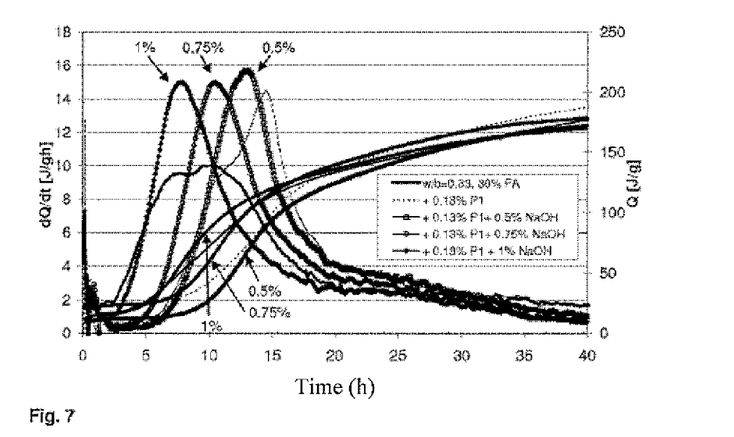
FIG. 7 A comparison of the course of the relative release of heat by various binder compositions containing a cement/fly ash binder, a dispersant (comb polymer) and various concentrations of activating agent (NaOH) as a function of time.

FIG. 7 shows the curve of the relative development of heat over time (measured at room temperature in an insulated measurement cell) of binder compositions containing a cement/fly ash binder (i) without additive agents, (ii) with dispersant (comb polymer P1) and (iii) with dispersant (comb polymer P1) and various concentrations of activating agents (NaOH). The left ordinate again shows the heat flow dQ/dt, while the right ordinate shows the cumulative quantity of heat Q. Likewise, 70% cement and 30% fly ash were used as binder components (water/binder ratio=0.33).

The measurements without additive and with dispersant (without activating agent) correspond to the measurements discussed with regard to FIG. 6. However, FIG. 7 shows that high concentrations of activating agent, i.e., NaOH, are more advantageous than low concentrations with respect to a high early strength. It may be assumed that this is also true of other activating agents.

Comb polymers which resist high concentrations of activating agent are thus particularly advantageous.

However, the embodiments described above are to be understood only as illustrative examples which can be modified in any way within the scope of the present invention.

The invention claimed is:

1. A method comprising dispersing a comb polymer KP in a binder composition containing:
    an alkaline activating agent,
    5 to 95 wt % of a latent hydraulic and/or puzzolanic binder, and
    5 to 95 wt % of a hydraulic binder;
    wherein:
    the activating agent is suitable for activation of the latent hydraulic and/or puzzolanic binder,
    the comb polymer KP has a polymer backbone composed of:
        multiple backbone monomers, and
        multiple polymer side chains bound to the backbone, each polymer side chain being composed of multiple side chain monomers;
    at least a portion of the backbone monomers has one or more ionizable groups, a structure constant K of the comb polymer KP is equal to or greater than 70, K being defined as:

$$K = \frac{[(N-1)z]^2}{nP^{9/5}N^{3/5}} \times 10^5,$$

where:
    n is an average number of side chains per comb polymer molecule,
    N is an average number of backbone monomers per side chain,
    P is an average number of side chain monomers per side chain, and
    z is an average number of ionizable groups per side chain-free backbone monomer.

2. The method according to claim 1, wherein the latent hydraulic and/or puzzolanic binder comprises silica dust, fly ash, puzzolan, and/or slag.

3. The method according to claim 1, wherein a concentration of the activating agent is 0.001 to 5 wt %, based on a weight of the binder.

4. The method according to claim 1, wherein the activating agent comprises an alkali metal hydroxide, alkali metal carbonate, and/or alkali metal sulfate.

5. The method according to claim 1, wherein the polymer backbone contains polymerized acrylic acid units, methacrylic acid units, and/or maleic acid units.

6. The method according to claim 1, wherein the polymer backbone contains of polymerized vinyl, allyl, and/or isoprenyl ether compounds.

7. The method according to claim 1, wherein the polymer side chains comprise polyethers.

8. The method according to claim 1, wherein the polymer side chains are bound to the polymer backbone at least partially by an ester group, an ether group, and/or an amide group.

9. The method according to claim 1, wherein an average total number of free acid groups to an average number of side chains per comb polymer molecule (n) is in a range of 2 to 5.

10. The method according to claim 1, wherein a number-average total weight M$_n$ of the comb polymer KP is 1,000-20,000 g/mol.

11. The method according to claim 1, wherein:
    n=2-50,
    N=2-10, and/or
    P=10-100.

12. The method according to claim 1, wherein the comb polymer KP has the following substructure units:
    a) n$_i$ substructure units S1 of formula (I):

b) n$_2$ substructure units S2 of formula (II):

c) n$_3$ substructure units S3 of formula (III):

d) $n_4$ substructure units S4 of formula (IV):

e) optionally $n_5$ units of at least one additional structure unit S5;
wherein:
- each $R^1$, $R^2$, and $R^3$ independently represents H, COOM, $CH_2COOM$, or an alkyl group with 1 to 5 carbon atoms,
- each $R^4$ independently represents —COOM, —$CH_2COOM$, —$SO_2$-OM, —O—$PO(OM)_2$ and/or —$PO(OM)_2$; or
- $R^3$ with $R^4$ forms a ring to yield —CO—O—CO—;
- M represents H, an alkali metal, an alkaline earth metal, ammonium, an ammonium cation, an organic ammonium compound, or mixtures thereof;
- q=0, 1, or 2;
- each Q independently represents —O—, —NH—, and/or —HC=N—,
- s=0 or 1;
- each A independently represents a $C_2$ to $C_4$ alkylene;
- t is within a range of from 2 to 300;
- each $R^5$ independently represents H, a $C_1$ to $C_{20}$ alkyl group, cyclohexyl group, or alkylaryl group;
- each $R^6$ independently represents a $C_1$ to $C_{20}$ alkyl group, cycloalkyl group, alkylaryl group, or $[AO]_t$—$R^5$;
- each $R^7$ independently represents —$NH_2$, —$NR^8R^9$, —$OR^{10}NR^{11}R^{12}$,
- $R^8$ and $R^9$ independently represent a $C_1$ to $C_{20}$ alkyl group, a cycloalkyl group, an alkylaryl group, an aryl group, a hydroxyalkyl group, an acetoxyethyl ($CH_3$—CO—O—$CH_2$—$CH_2$—) group, a hydroxyisopropyl (HO—$CH(CH_3)$—$CH_2$—) group, or an acetoxyisopropyl ($CH_3$—CO—O—$CH(CH_3)$—$CH_2$—) group; or
- $R^8$ and $R^9$ together form a morpholine or an imidazoline ring;
- $R^{10}$ is a $C_2$-$C_4$ alkylene group,
- $R^{11}$ and $R^{12}$, independently of one another, are each a $C_1$ to $C_{20}$ alkyl group, cycloalkyl group, alkylaryl group, aryl group, or a hydroxyalkyl group,
- $n_1$, $n_2$, $n_3$, $n_4$, and $n_5$ denote an average number of respective substructure units S1, S2, S3, S4, and S5 in a molecule of the comb polymer KP,
- $n_1$ is within a range of from 0.1 to 0.9,
- $n_2$ is within a range of from 0.1 to 0.9,
- $n_3$ is within a range of from 0 to 0.8,
- $n_4$ is within a range of from 0 to 0.8, and
- $n_5$ is within a range of from 0 to 0.8.

13. The method according to claim 1, wherein a concentration of the activating agent is within a range of 0.1 to 5 wt %.

14. The method according to claim 1, wherein a concentration of the activating agent is within a range of 0.1 to 1.5 wt %.

15. The method according to claim 1, wherein the activating agent comprises an alkali metal carbonate and/or an alkali metal sulfate.

16. The method according to claim 1, wherein the activating agent comprises KOH, $Na_2CO_3$, and/or $Na_2SO_4$.

17. The method according to claim 1, wherein the activating agent comprises $Na_2CO_3$.

18. The method according to claim 1, wherein a concentration of the activating agent is within a range of 0.1 to 5 wt % and the activating agent comprises an alkali metal hydroxide, alkali metal carbonate, and/or alkali metal sulfate.

19. A binder composition, containing:
- a mineral binder comprising 5 to 95 wt % of a latent hydraulic and/or a puzzolanic binder, and 5 to 95 wt % of a hydraulic binder;
- an alkaline activating agent; and
- a comb polymer KP having a polymer backbone composed of:
  - multiple backbone monomers, and
  - multiple polymer side chains bound to the backbone, each polymer side chain composed of multiple side chain monomers;
wherein:
- at least a portion of the backbone monomers has one or more ionizable groups,
- a structure constant K of the comb polymer KP is equal to or greater than 70, K being defined as:

$$K = \frac{[(N-1)z]^2}{nP^{9/5}N^{3/5}} \times 10^5,$$

where:
- n is an average number of side chains per comb polymer molecule,
- N is an average number of backbone monomers per side chain,
- P is an average number of side chain monomers per side chain,
and
- z is an average number of ionizable groups per side chain-free backbone monomer.

20. A method for producing the binder composition according to claim 19, the method comprising mixing together the mineral binder with the comb polymer KP and the alkaline activating agent.

21. A molded body obtained by hardening the binder composition according to claim 20 after addition of water.

* * * * *